(12) United States Patent
Vinayagam et al.

(10) Patent No.: US 11,501,311 B2
(45) Date of Patent: Nov. 15, 2022

(54) SYSTEM FOR REDUCING TRANSACTION FAILURE

(71) Applicant: PAYPAL, INC., San Jose, CA (US)

(72) Inventors: Logasundari Vinayagam, Fremont, CA (US); Aniket Vilas Jadhav, San Jose, CA (US); Rahul Nimje, San Jose, CA (US); Arie Benhamou, Tel Aviv (IL); Nagavenkatasyamsundar Ambadipudi, San Jose, CA (US); Eitan Torf, Tel Aviv (IL); Gayathri Baskaran, San Jose, CA (US); Phanishankar Pandravada, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 164 days.

(21) Appl. No.: 16/730,945

(22) Filed: Dec. 30, 2019

(65) Prior Publication Data

US 2021/0201319 A1 Jul. 1, 2021

(51) Int. Cl.
| | |
|---|---|
| *G06Q 20/40* | (2012.01) |
| *G06Q 40/02* | (2012.01) |
| *G06Q 20/34* | (2012.01) |
| *G06F 16/245* | (2019.01) |
| *G06N 20/00* | (2019.01) |

(52) U.S. Cl.
CPC ......... *G06Q 20/409* (2013.01); *G06F 16/245* (2019.01); *G06N 20/00* (2019.01); *G06Q 20/34* (2013.01); *G06Q 20/354* (2013.01); *G06Q 20/407* (2013.01); *G06Q 40/02* (2013.01)

(58) Field of Classification Search
CPC .... G06Q 20/40; G06Q 20/354; G06Q 20/407; G06Q 40/02; G06Q 20/34; G06N 20/00; G06F 16/245
USPC .......................................................... 705/44
See application file for complete search history.

(56) References Cited

U.S. PATENT DOCUMENTS

| | | | | |
|---|---|---|---|---|
| 8,041,619 | B1 * | 10/2011 | Liu et al. ............... | G06Q 40/00 705/35 |
| 8,554,631 | B1 * | 10/2013 | Barton et al. .......... | G06Q 20/00 705/16 |
| 2002/0099649 | A1 | 7/2002 | Lee et al. | |
| 2013/0346311 | A1 | 12/2013 | Boding et al. | |
| 2014/0258099 | A1 | 9/2014 | Rosano | |

FOREIGN PATENT DOCUMENTS

EP 3657420 * 11/2018 ............. G06Q 20/40

\* cited by examiner

*Primary Examiner* — Lindsay M Maguire
(74) *Attorney, Agent, or Firm* — Haynes and Boone, LLP (57) ABSTRACT

A method includes receiving a payment request that indicates a card identifier corresponding to a payment instrument to be used for payment. The method further includes determining that the card identifiers fails to satisfy at least one card activity criteria. Additionally, method includes subsequent to determining that no failed authorization attempts were performed for the card identifier within a previous time period, retrieving, from a database, a decline probability score associated with the card identifier. The method also includes based on the decline probability score, determining whether to transmit an authorization request for the card identifier prior to processing the payment request.

20 Claims, 5 Drawing Sheets

SYSTEM FOR REDUCING TRANSACTION FAILURE

BACKGROUND

Technical Field

This disclosure relates generally to facilitating digital transactions and, more specifically, to a system for reducing transaction failure.

Description of the Related Art

Digital transactions are a ubiquitous part of everyday business and commerce. Consumers who purchase items online typically store card information with merchants and/or digital wallets to facilitate ease of payment at checkout. However, transactions can be declined due to various reasons. For example, if the card as expired, the issuer of the card will the decline the transaction leading to financial loss for a merchant and/or service provider facilitating the transaction. Declined transactions may also degrade consumer experiences.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "account selection module" "configured to select and/or identify one or more accounts" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for implementing a system for reducing transaction failures. A service provider system maintained by a service provider is configured to receive and process digital transactions associated with various user accounts with the service provider. The service provider system includes multiple modules and applications that communicate with each other to process a transaction.

According to a particular embodiment, the service provider system may receive a request to process a payment transaction for a user account with the service provider. The request may indicate an account identifier associated with a user account. The request may also indicate a card identifier of a payment card associated with the account to be used for payment.

Various reasons may cause the payment card to be declined, such as an expiration of the payment card, a spending limit of the payment card, a replacement of the payment card, and/or the like. Every time a payment card is processed and then declined, the service provider may incur a financial loss, and the experience for the user may also be impacted. Typical solutions to this problem may be to transmit an authorization request (e.g., such as to an issuer server corresponding to the issuer of the payment card) before processing any payment card. However, transmitting such authorization requests may also be associated with a monetary cost to the service provider, as well as a latency cost for the service provider system to complete processing of the payment transaction.

Thus, prior to processing the payment card for the payment transaction, the service provider system may be configured to determine a likelihood that the payment card will be declined by the issuer of the payment card. The service provider system may perform this determination based on a combination of a set of rules and an output of executing a machine learning model.

For example, the service provider system may be configured to train the machine learning model using a set of previous transactions. A predetermined percentage of the set of previous transactions may correspond to transactions that have been terminated due to a declined payment card. According to a particular embodiment, the training data is used to train a gradient boosted tree machine learning model. The model outputs a decline score which indicates a probability that a payment card (e.g., represented by its associated card identifier) will be declined if processed for payment.

Additionally, the service provider system includes a database that stores associations between card identifiers (e.g., credit/debit card numbers, gift card numbers, bank identification numbers, a random number generated by the service provider system, and/or any combination of the above) and transaction information corresponding to previous transactions using the card identifiers. The machine learning model is executed with respect to the card identifiers and their respective transaction information to determine decline probability scores for the card identifiers. Further, in a particular embodiment, the machine learning model is executed on a periodic basis (e.g., hourly, daily, weekly, etc.)

As part of executing the machine learning model, the server provider system may, for each card identifier, extract one or more features based on its associated transaction information. Such features may include a number of declined transactions using the card identifier within one or more previous time periods (e.g., the past three months, the past six months, the past year, etc.), an average tractions amount for the number of declined transactions over said time periods, one or more locations in which transactions using the card identifier were performed, and/or the like. As such the extracted features may be input into the machine learning model, which outputs the respective decline probability score for the card identifier.

In certain embodiments, for different accounts that are associated with the same payment card, the service provider system may generate different card identifiers for the payment card for each respective account. However, the service provider system generates the different card identifiers such that applying a hashing function to the card identifiers produces the same hash value. To this end, after the machine learning model scores the different card identifiers, each of the card identifiers are hashed using the hashing function. The service provider system identifies duplicate hashes and for each set of duplicate hashes, determines a single decline probability score for the payment card associated with the set. For example, within each set, the service provider system may identify the hash associated with the most recent transactions and assign that hash's decline probability score for the associated payment card. As another example, the service provider system may calculate an average of the decline probability scores for each set.

The decline probability scores calculated by the machine learning model may be used as part of a real-time determination of whether to transmit an authorization request in a real-time transaction processing. For example, subsequent to receiving the request to process the payment transaction, the service provider system may determine whether the transaction information associated with the card identifier satisfies one or more card activity criteria. The card activity criteria may include, but is not limited to, past use of the card identifier in a payment transaction within a predetermined time period, an addition of the card identifier as a payment option for the user account within the predetermined time period, a successful authorization of the card identifier within the predetermined time period. According to some embodiments, if the card identifiers satisfies the one or more card activity criteria, the service provider server processes the payment transaction without transmitting an authorization request for the card identifier.

If the card identifier fails to satisfy the one or more card activity criteria, service provider system may determine whether a failed authorization attempt was made for the card identifier within a certain time period (e.g., an authorization request was made for the card identifier was denied). If so, the service provider system may terminate and/or decline the payment transaction without transmitting an authorization request for the card identifier. Further, the service provider system may also remove the card identifier (e.g., the payment card associated with the card identifier) as payment option for the user account.

If no failed authorization attempt was made, the service provider system may transmit an authorization request, such as to a payment network, for the card identifier. The authorization request may be a zero-dollar authorization request or a nominal non-zero authorization request. If the card identifier is authorized (e.g., receives an affirmative response to the authorization request), the service provider system continues processing the payment transaction. If the card identifier is not authorized (e.g., the authorization request is denied), the service provider system may terminate the transaction and/or remove the payment card associated with the card identifier as a payment option for the user account.

Figure 1:
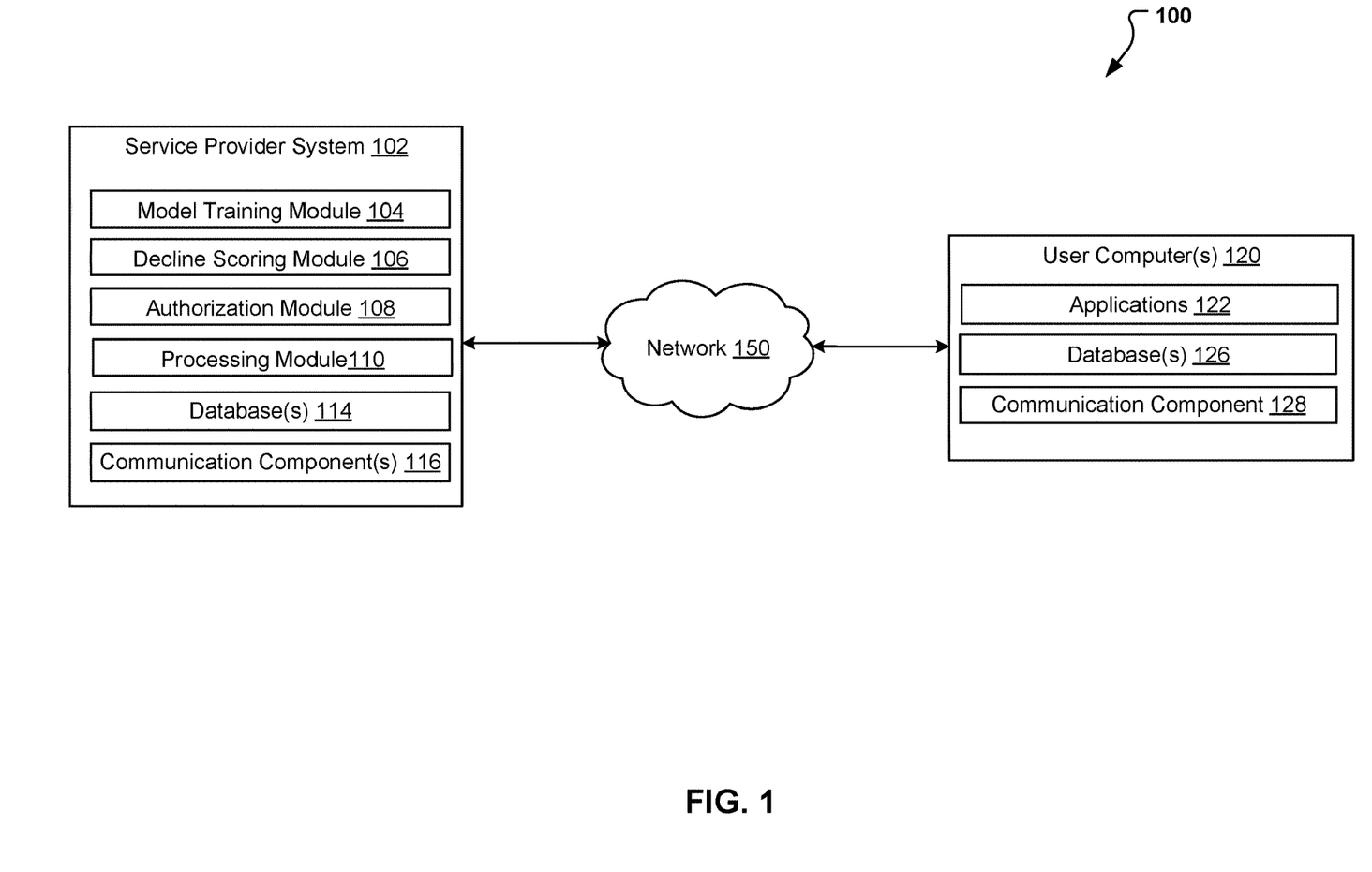
FIG. 1 is a block diagram illustrating an example system for a system for reducing transaction failures, according to some embodiments.

FIG. 1 is a block diagram illustrating an example system 100 for reducing transaction failure. In the illustrated embodiment, the system 100 includes a service provider system 102, maintained by a service provider, in communication with other computer(s) 120 via a network 150. It will be appreciated that the service provider system 102 may include one or more computers, servers, and/or other devices, and that the modules included in the service provider system 102 may be executed by any combination of those devices.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include a model training module 104, a decline scoring module 106, an authorization module 108, a processing module 110, database(s) 114, and communication components 116. Each of the components of the service provider system 102 may communicate with each other to implement the system for reducing transaction failure, as will be described in more detail below.

The service provider system 102 may be configured to process payment transactions corresponding to various user accounts with service provider (e.g., such as those initiated by the user computer(s) 120). The service provider system 102 includes a model training module 104 that trains a machine learning model for calculating decline probably scores for card identifiers store by the service provider system 102. The model training module 104 is configured retrieve a set of training data that includes transaction information corresponding to a set of card identifiers. According to certain embodiments, a predetermined percentage of the training data represents transactions that have been declined.

According to a particular embodiment, the model training module 104 uses the training data to train a gradient boosted tree machine learning model. However, it will be appreciated that any type of machine learning model trained by the model training module 104, including random forests, neural networks, and/or the like. During training, the model training module 104 may derive a feature set of one or more features. The feature set may include, but is not limited to, a number of declined transactions using the card identifier within one or more previous time periods (e.g., the past three months, the past six months, the past year, etc.), an average tractions amount for the number of declined transactions over said time periods, one or more locations in which transactions using the card identifier were performed, and/or the like.

The decline scoring module 106 is configured to execute the machine learning model trained by the model training module 104 on transaction information associated with various card identifiers of payment cards stored by the service provider system 102. For example, the database 114 may store associations between card identifiers and respective transaction information associated with the card identifiers. By executing the machine learning model, the decline scoring module 106 determines respective decline probability scores for a set of card identifiers stored in the database 114. In certain embodiments, the decline scoring module 106 executes the machine learning model on a periodic basis (e.g., hourly, daily, weekly, etc.). As part of executing the machine learning model, the decline scoring module 106 may, for each card identifier, extract one or more features from the feature set based on its respective transaction information. The extracted features may be input into the machine learning model, which outputs the respective decline probability score for the card identifier.

In certain embodiments, for different accounts that are associated with the same payment card, the decline scoring module 106 may generate different card identifiers for the payment card for each respective account. However, the decline scoring module 106 generates the different card identifiers such that applying a hashing function to the card identifiers produces the same hash value. To this end, after the machine learning model scores the different card identifiers, each of the card identifiers are hashed using the hashing function. The decline scoring module 106 identifies duplicate hashes and for each set of duplicate hashes and determines a single decline probability score for the payment card associated with the set. For example, within each set, the decline scoring module 106 may identify the hash associated with the most recent transactions and assign that hash's decline probability score for the associated payment card. As another example, the decline scoring module 106 may calculate an average of the decline probability scores for each set. The card identifiers and their respective decline probability scores may also be stored in the database 114 and/or a different database or storage medium.

The authorization module 108 is configured to perform a real-time determination as to whether an authorization request is to be transmitted corresponding to a card identifier. For instance, the service provider system 102 may receive a request to process a payment transaction using a payment card. The payment card may be associated with a card identifier. As such, the authorization module 108 may determine whether the transaction information associated with the card identifier satisfies one or more card activity criteria. The card activity criteria may include, but is not limited to, past use of the card identifier in a payment transaction within a predetermined time period, an addition of the card identifier as a payment option for the user account within the predetermined time period, a successful authorization of the card identifier within the predetermined time period. According to some embodiments, if the card identifiers satisfies the one or more card activity criteria, the authorization module 108 instructs the processing module 110 to process the payment transaction without transmitting an authorization request for the card identifier.

If the card identifier fails to satisfy the one or more card activity criteria, the authorization module 108 may determine whether a failed authorization attempt was made for the card identifier within a certain time period (e.g., an authorization request was made for the card identifier was denied). If so, the authorization module 108 may terminate and/or decline the payment transaction without transmitting an authorization request for the card identifier. Further, the authorization module 108 may also remove the card identifier (e.g., the payment card associated with the card identifier) as payment option for the user account.

If no failed authorization attempt was made, the authorization module 108 may determine whether to transmit an authorization request based on a decline probability score associated with the card identifier. If the decline probability score fails to satisfy a score threshold, the authorization module 108 may be configured to cause the processing module 110 to process the payment transaction without transmitting an authorization request for the card identifier.

If the decline probability score satisfies the score threshold, the authorization module 108 may transmit an authorization request, such as to a payment network, for the card identifier. The authorization request may be a zero-dollar authorization request or a nominal non-zero authorization request. If the card identifier is authorized (e.g., receives an affirmative response to the authorization request), the authorization module 108 causes the processing module 110 to continue processing the payment transaction. If the card identifier is not authorized (e.g., the authorization request is denied), the authorization module 108 may terminate the transaction and/or remove the payment card associated with the card identifier as a payment option for the user account. In other embodiments, if the card identifier is not authorized, the authorization module 108 may identify if a second card identifier for a second payment card exists as a payment option for the user account. If so, the authorization module 108 may transmit an authorization request for the second card identifier.

The database(s) 114 stores various information that may include, for example, identifiers (IDs) such as operating system registry entries, cookies, IDs associated with hardware of the communication component 116, IDs used for payment/user/device authentication or identification, card IDs and transaction information associated with the card IDs, and/or other appropriate IDs. Further, the database 114 may store login credentials (e.g., such as to login to an account with the service provider and/or other accounts with other service providers), identification information, biometric information, and/or authentication information of the user the applications 122 connect to the service provider system 102 to access. The database 114 may also store the review queue 106 in some embodiments.

The communication component 116 may be configured to communicate with various other devices, such as the user computer(s) 120 and/or other devices. In various embodiments, communication component 14 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer(s) 120, each of which includes applications 122, database 126, and communication component 128. As previously discussed, the applications 122 may be any type of application that access the service provider system 102. According to a particular embodiment, the applications are user applications for a payment service provider that communicates with the service provider system 102 to facilitate payment transactions and other financial transactions.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
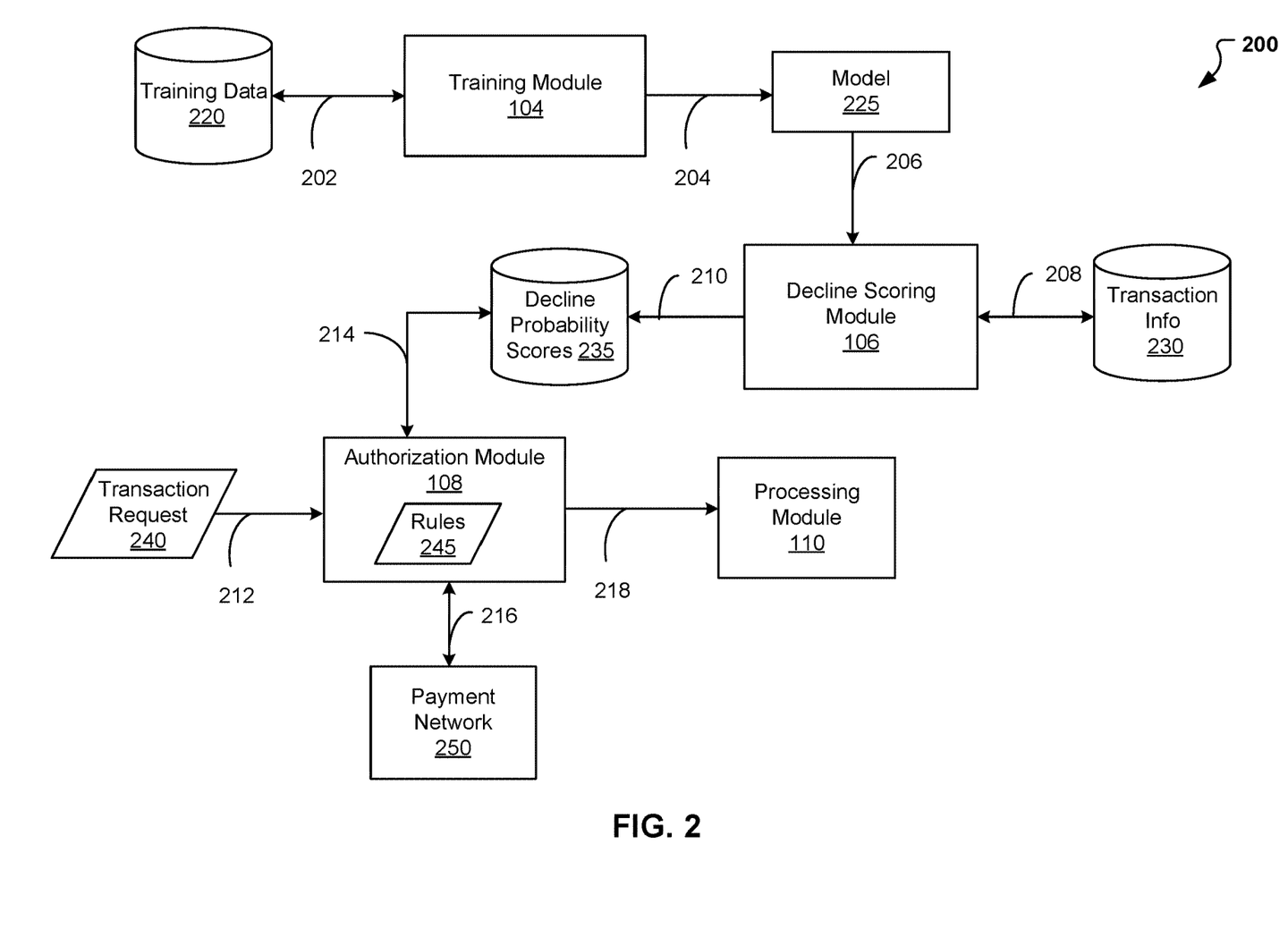
FIG. 2 is a diagram illustrating a data flow for a system for reducing transaction failures, according to some embodiments.

FIG. 2 illustrates a data flow diagram 200 for a system for reducing transaction failure in accordance with a particular embodiment. As shown in FIG. 2, the training module may access training data 220 and step 202. At step 204, the training module 104 may train a machine learning model 225. The machine learning model is provided to the decline scoring module at step 206. At step 208, the decline scoring module 106 accesses transaction information 230 associated with a set of card identifiers. The decline scoring module 106 executes the machine learning model using the transaction information as input 230 to calculate respective decline probability scores corresponding to the set of card identifiers. At step 210, the decline scoring module 106 stores the respective decline probability scores 235 in a storage, such as the database 114.

At step 212, the authorization module 108 may receive a payment transaction request 240. The payment transaction request 240 may indicate a particular card identifier to be used for payment. The authorization module 108 retrieves a decline probability score associated with the particular card identifier at step 214. Based on a set of rules 245 and the decline probability score, the authorization module 108 determines whether to transmit an authorization request to a payment network 250 for the particular card identifier.

At step 216, the authorization module 108 optionally transmits the authorization request for the particular card identifier to the payment network 250 if it determines that the authorization request is appropriate. At step 218, the processing module 110 processes a payment corresponding to the payment transaction request if the authorization module 108 determines not to terminate the payment transaction.

Figure 3:
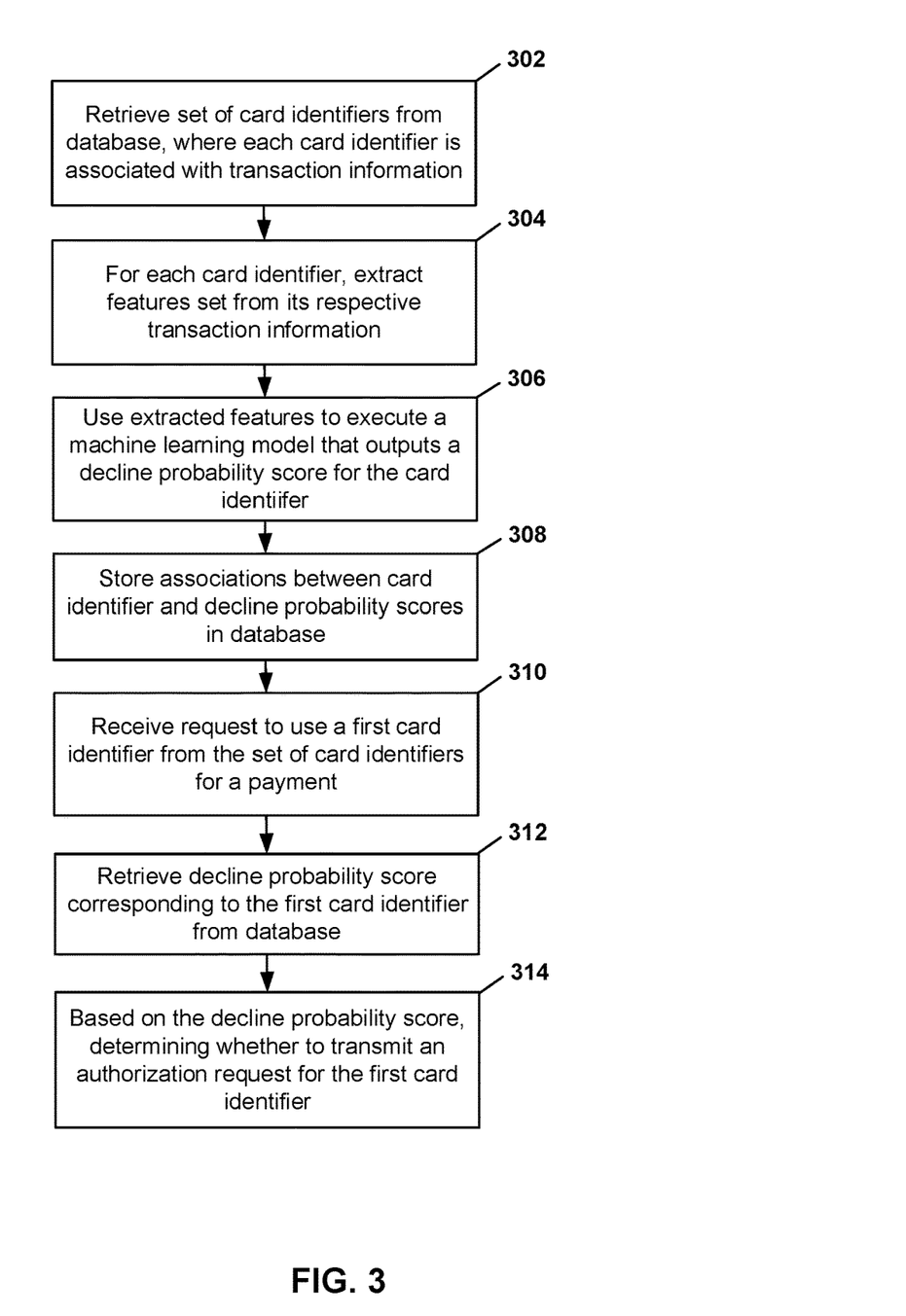
FIG. 3 is a diagram illustrating a process for generating decline probability scores, according to some embodiments.

FIG. 3 illustrates a flow diagram of a method 300 for generating decline probability scores, in accordance with one or more particular embodiment. The method 300 may begin at step 302, where a service provider system, such as service provider system 102 may retrieve a set of card identifiers from a database. Each card identifier in the set of card identifiers may be associated with transaction information. At step 304, the service provider system may, for each card identifier n the set of card identifiers, extract a feature set from its respective transaction information.

At step 306, the service provider system may use the extracted feature sets to execute a machine learning model. Based on the execution, the machine learning model calculates a decline probability score for each card identifier in the set. At step 308, the service provider system stores associations between the card identifiers and their respective decline probability scores in a database.

At step 310, the service provider system receives a request to use a first card identifier from the set of card identifiers for payment in a payment transaction. At step 312, the service provider system retrieves the decline probability score corresponding to the first card identifier from the database. At step 314, the service provider system determines whether to transmit an authorization request for the first card identifier based on its respective decline probability score.

Figure 4:
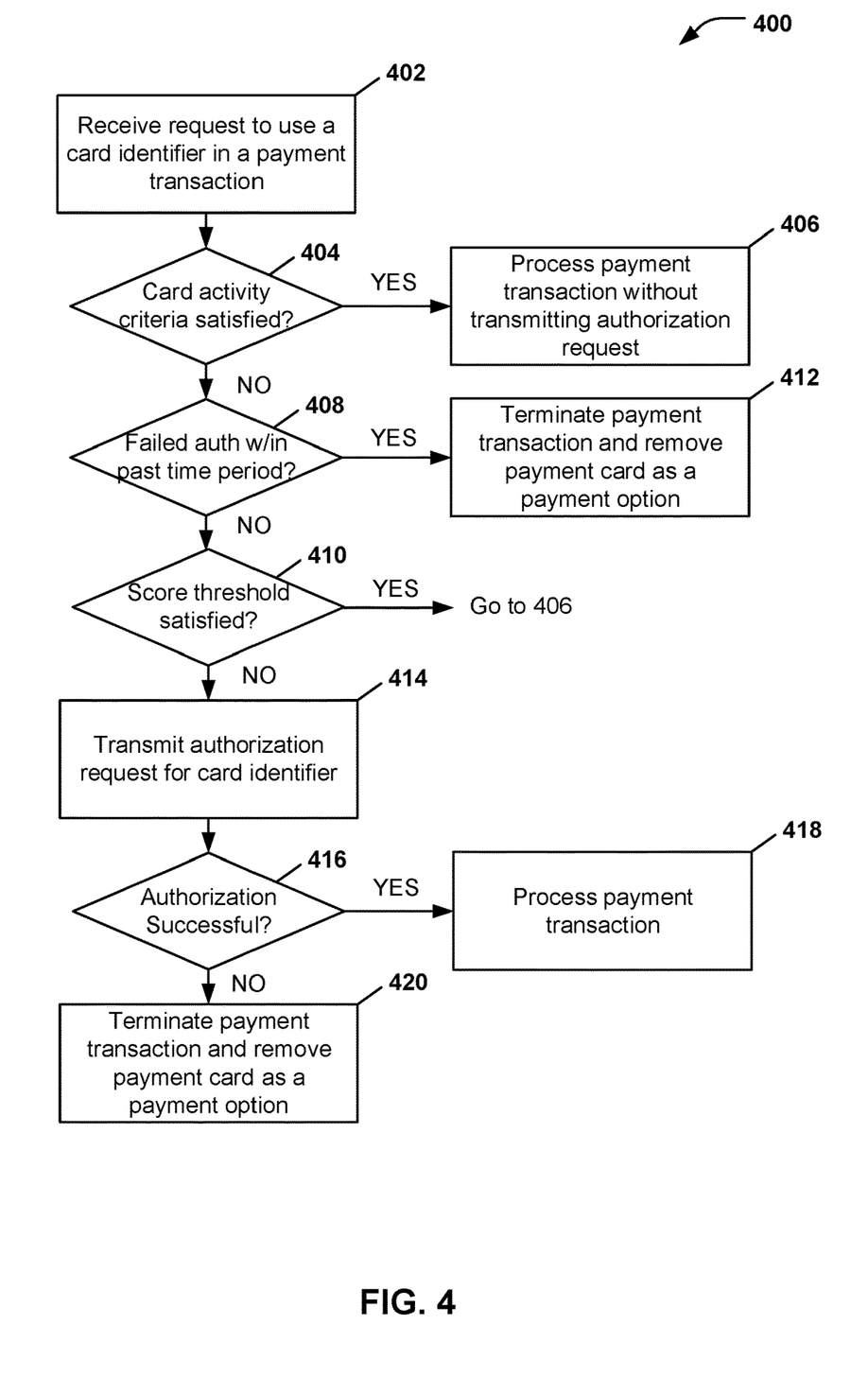
FIG. 4 illustrate a flow diagram that depicts a method for determining whether to transmit an authorization request, according to some embodiments.

FIG. 4 illustrates a flow diagram of a method 400 for determining whether to transmit an authorization request, in accordance with one or more particular embodiments. The method 400 may be performed by a service provider system, such as the service provider system 102. The method 400 beings at step 402 where the service provider system receives a request to use a card identifier (e.g., the payment card associated with the card identifier) in a payment transaction. The card identifier may be stored as a payment option for a user account with the service provider that maintains the service provider system.

At step 404, the service provider system determines whether the card identifier satisfies one or more card activity criteria. If so, the method proceeds to step 406, where the service provider system processes the payment transaction without transmitting an authorization request for the card identifier. If not, the method 400 proceeds to step 408.

At step 408, the service provider system determines whether it has previously made a failed authorization attempt for the card identifier within a past time period. If so, the method proceeds to step 412, where the service provider system terminates the payment transaction and removes the payment card associated with the card identifier as a payment option for the user account. If not, the method 400 proceeds to step 410, where the service provider system determines whether a decline probability score corresponding to the card identifier satisfies a score threshold.

If so, the method proceeds to step 406, where the service provider system processes the payment transaction without transmitting an authorization request for the card identifier. If the decline probability score fails to satisfy the score threshold, the method 400 proceeds to step 414. At step 414, the service provider system transmit an authorization request for the card identifier, such as to a payment network.

At step 416, the service provider system may determine whether authorization for the card identifier was successful based on the response to the authorization request from the payment network. If so, the method 400 proceeds to step 418, where the service provider system continues processing the payment transaction. If authorization for the card identifier was not successful, the method proceeds to step 420, where the service provider system terminates the payment transaction and removes the payment card associated with the card identifier as a payment option for the user account.

Example Computing Device

Figure 5:
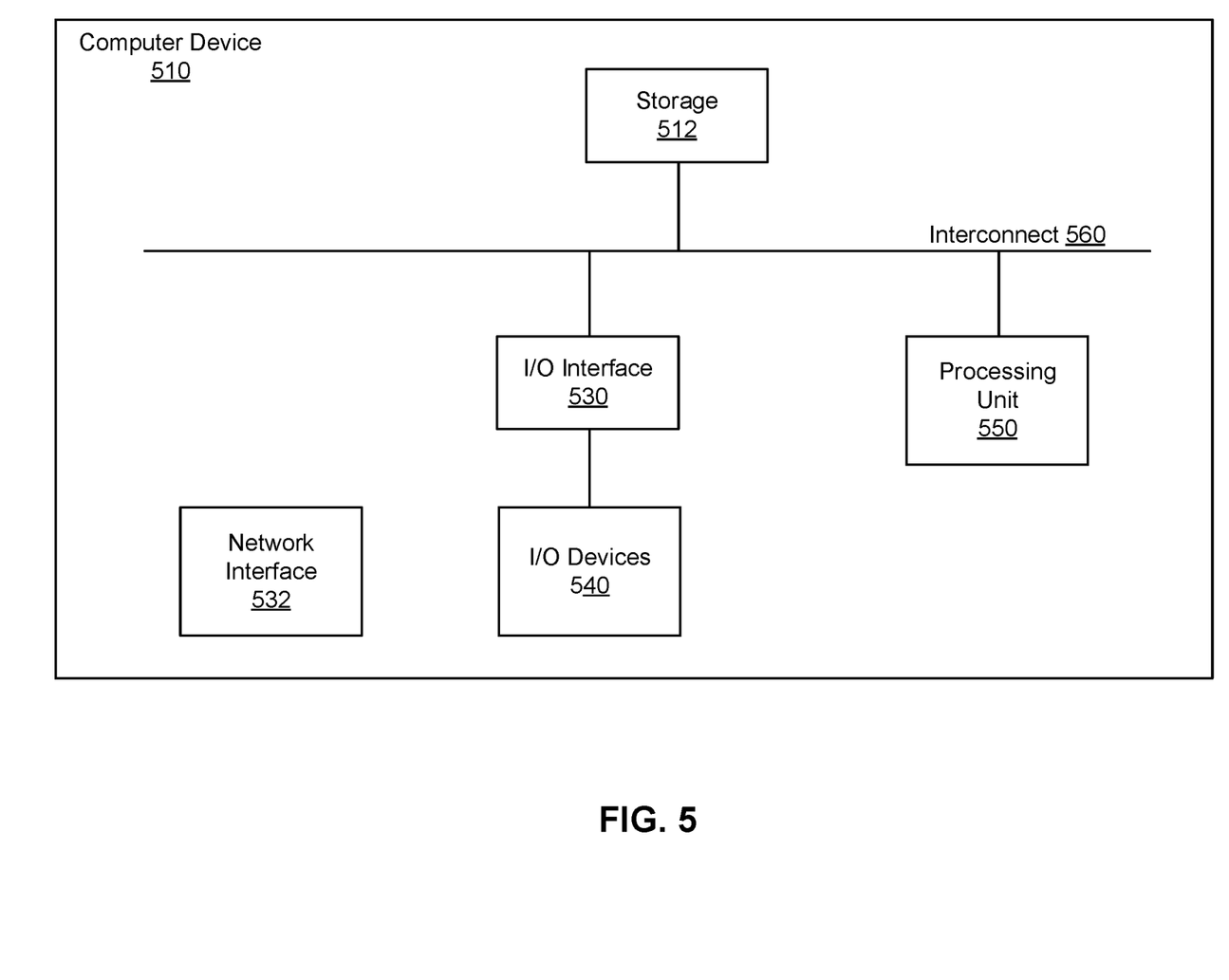
FIG. 5 is a block diagram illustrating an exemplary computing device, according to some embodiments.

Turning now to FIG. 5, a block diagram of one embodiment of computing device (which may also be referred to as a computing system) 510 is depicted. Computing device 510 may be used to implement various portions of this disclosure including any of the components illustrated in FIG. 1 and FIG. 2A-C. Computing device 510 may be any suitable type of device, including, but not limited to, a personal computer system, desktop computer, laptop or notebook computer, mainframe computer system, web server, workstation, or network computer. As shown, computing device 510 includes processing unit 550, storage 512, and input/output (I/O) interface 530 coupled via an interconnect 560 (e.g., a system bus). I/O interface 530 may be coupled to one or more I/O devices 540. Computing device 510 further includes network interface 532, which may be coupled to network 520 for communications with, for example, other computing devices.

In various embodiments, processing unit 550 includes one or more processors. In some embodiments, processing unit 550 includes one or more coprocessor units. In some embodiments, multiple instances of processing unit 550 may be coupled to interconnect 560. Processing unit 550 (or each processor within 550) may contain a cache or other form of on-board memory. In some embodiments, processing unit 550 may be implemented as a general-purpose processing unit, and in other embodiments it may be implemented as a special purpose processing unit (e.g., an ASIC). In general, computing device 510 is not limited to any particular type of processing unit or processor subsystem.

Storage subsystem 512 is usable by processing unit 550 (e.g., to store instructions executable by and data used by processing unit 550). Storage subsystem 512 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 512 may consist solely of volatile memory, in one embodiment. Storage subsystem 512 may store program instructions executable by computing device 510 using processing unit 550, including program instructions executable to cause computing device 510 to implement the various techniques disclosed herein.

I/O interface 530 may represent one or more interfaces and may be any of various types of interfaces configured to couple to and communicate with other devices, according to various embodiments. In one embodiment, I/O interface 530 is a bridge chip from a front-side to one or more back-side buses. I/O interface 530 may be coupled to one or more I/O devices 540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method, comprising:

training a machine learning model based on one or more features extracted from previous transactions associated with a plurality of payment instruments, the machine learning model comprising a gradient boosted tree model, a random forest model, or a neural network model, a predetermined percentage of the previous transactions corresponding to transactions that have been terminated due to the associated payment instrument being declined;

receiving, by a service provider system comprising one or more hardware processors, a payment request that indicates a card identifier corresponding to a payment instrument to be used for payment, the payment instrument being different from the plurality of payment instruments, the payment request indicating a user account associated with the card identifier;

determining that the card identifier fails to satisfy at least one card activity criteria;

subsequent to determining that no failed authorization attempts were performed for the card identifier within a previous time period, calculating a decline probability score associated with the card identifier, wherein the calculating the decline probability score further comprises:

scoring the card identifier using the trained machine learning model;

generating, after the scoring, a plurality of hashes at least in part by applying a hashing function to the card identifier;

identifying, from the plurality of hashes, a first hash that meets a predefined criterion;

determining a single decline probability score for the first hash; and assigning the single decline probability score as the decline probability score associated with the card identifier;

based on the decline probability score, determining whether to transmit an authorization request for the card identifier prior to processing the payment request;

transmitting, in response to a determination that the decline probability score satisfies a score threshold, the authorization request for the card identifier;

determining whether an authorization for the card identifier was successful based on a received response to the authorization request; and in response to a determination that the authorization was unsuccessful, terminating a payment process corresponding to the payment request.

2. The method of claim 1, further comprising:

identifying, in response to the determination that the authorization was unsuccessful, a second card identifier associated with the user account; and transmitting a second authorization request for the second card identifier.

3. The method of claim 2, further comprising:

retrieving a second decline probability score associated with the second card identifier;

determining that the second decline probability score fails to satisfy the score threshold; and responsive to the determining that the second decline probability score fails to satisfy the score threshold, processing the payment request without transmitting the authorization request for the card identifier.

4. The method of claim 1, wherein the at least one card activity criteria comprises at least one of, a use of the card identifier within a previous time period, an addition of the card identifier as a payment option for a user account within the previous time period, or a successful authorization of the card identifier within the previous time period.

5. The method of claim 1, wherein the decline probability score is calculated in real time.

6. The method of claim 1, wherein the machine learning model is executed to calculate the decline probability score on a periodic basis.

7. The method of claim 1, further comprising: removing, in response to a determination that the authorization was unsuccessful, the payment instrument as a payment option from the user account.

8. A non-transitory computer readable medium storing computer-executable instructions that in response to execution by one or more hardware processors, causes a service provider system to perform operations comprising:

accessing a machine learning model based on one or more features extracted from previous transactions associated with a plurality of payment instruments, the machine learning model comprising a gradient boosted tree model, a random forest model, or a neural network model, a predetermined percentage of the previous transactions corresponding to transactions that have been terminated due to the associated payment instrument being declined;

receiving a payment request that indicates a card identifier corresponding to a payment instrument to be used for payment, the payment instrument being different from the plurality of payment instruments, the payment request indicating a user account associated with the card identifier;

determining that the card identifier fails to satisfy at least one card activity criteria;

subsequent to determining that no failed authorization attempts were performed for the card identifier within a previous time period, calculating a decline probability score associated with the card identifier, wherein the calculating the decline probability score further comprises:

scoring the card identifier based on the machine learning model;

generating a plurality of hashes at least in part by applying a hashing function to the card identifier;

identifying, from the plurality of hashes, a first hash that meets a predefined criterion;

determining a single decline probability score for the first hash; and assigning the single decline probability score as the decline probability score associated with the card identifier;

based on the decline probability score, determining whether to transmit an authorization request for the card identifier prior to processing the payment request;

transmitting, in response to a determination that the decline probability score satisfies a score threshold, the authorization request for the card identifier;

determining whether an authorization for the card identifier was successful based on a received response to the authorization request; and in response to a determination that the authorization was unsuccessful, terminating a payment process corresponding to the payment request.

9. The non-transitory computer readable medium of claim 8, wherein the operations further comprise:

identifying, in response to the determination that the authorization was unsuccessful, a second card identifier associated with the user account; and transmitting a second authorization request for the second card identifier.

10. The non-transitory computer readable medium of claim 9, wherein the operations further comprise:

retrieving a second decline probability score associated with the second card identifier;

determining that that the second decline probability score fails to satisfy the score threshold; and responsive to the determining that the second decline probability score fails to satisfy the score threshold, processing the payment request without transmitting the authorization request for the card identifier.

11. The non-transitory computer readable medium of claim 8, wherein the decline probability score is calculated in real time.

12. A system, comprising:

a non-transitory memory; and one or more hardware processors coupled to the non-transitory memory and configured to read instructions from the non-transitory memory to cause the system to perform operations comprising:

accessing a machine learning model based on one or more features extracted from previous transactions associated with a plurality of payment instruments, the machine learning model comprising a gradient boosted tree model, a random forest model, or a neural network model, a predetermined percentage of the previous transactions corresponding to transactions that have been terminated due to the associated payment instrument being declined;

receiving a payment request that indicates a card identifier corresponding to a payment instrument to be used for payment, the payment instrument being different from the plurality of payment instruments, the payment request indicating a user account associated with the card identifier determining that the card identifier fails to satisfy at least one card activity criteria;

subsequent to determining that no failed authorization attempts were performed for the card identifier within a previous time period, calculating a decline probability score associated with the card identifier, wherein the calculating the decline probability score further comprises:

scoring the card identifier using the machine learning model;

generating, after the scoring, a plurality of hashes at least in part by applying a hashing function to the card identifier;

identifying, from the plurality of hashes, a first hash that meets a predefined criterion;

determining a single decline probability score for the first hash; and assigning the single decline probability score as the decline probability score associated with the card identifier;

based on the decline probability score, determining whether to transmit an authorization request for the card identifier prior to processing the payment request;

transmitting, in response to a determination that the decline probability score satisfies a score threshold, the authorization request for the card identifier;

determining whether an authorization for the card identifier was successful based on a received response to the authorization request; and in response to a determination that the authorization was unsuccessful, terminating a payment process corresponding to the payment request.

13. The system of claim 12, wherein the operations further comprise:

identifying, in response to the determination that the authorization was unsuccessful, a second card identifier associated with the user account; and transmitting a second authorization request for the second card identifier.

14. The system of claim 13, wherein the operations further comprise:

retrieving a second decline probability score associated with the second card identifier;

determining that that the second decline probability score fails to satisfy the score threshold; and responsive to the determining that the second decline probability score fails to satisfy the score threshold, processing the payment request without transmitting the authorization request for the card identifier.

15. The system of claim 12, wherein the at least one card activity criteria comprises at least one of, a use of the card identifier within a previous time period, an addition of the card identifier as a payment option for a user account within the previous time period, or a successful authorization of the card identifier within the previous time period.

16. The system of claim 12, wherein the predefined criterion comprises a most recent transaction.

17. The system of claim 12, wherein the decline probability score is calculated in real time.

18. The system of claim 12, wherein the authorization request includes a zero-dollar authorization request.

19. The system of claim 12, wherein the the decline probability score is calculated on a periodic basis.

20. The system of claim 12, wherein the operations further comprise: removing, in response to a determination that the authorization was unsuccessful, the payment instrument as a payment option from the user account.

* * * * *